(12) United States Patent
Zamanian et al.

(10) Patent No.: US 8,040,539 B2
(45) Date of Patent: Oct. 18, 2011

(54) METHOD AND SYSTEM FOR MITIGATING ERRORS WHEN PROCESSING PRINT STREAM DATA

(75) Inventors: Elaheh E. Zamanian, Trumbull, CT (US); Yichun Zhang, Webster, NY (US); Vinod B. Nethala, Shelton, CT (US); Vishnu Sharma, Bhubaneshwar (IN)

(73) Assignee: Pitney Bowes Inc., Stamford, CT (US)

( * ) Notice: Subject to any disclaimer, the term of this patent is extended or adjusted under 35 U.S.C. 154(b) by 1204 days.

(21) Appl. No.: 11/799,418

(22) Filed: May 1, 2007

(65) Prior Publication Data

US 2008/0188978 A1 Aug. 7, 2008

Related U.S. Application Data

(60) Provisional application No. 60/899,595, filed on Feb. 5, 2007.

(51) Int. Cl.
*G06F 15/00* (2006.01)
*G06F 19/00* (2011.01)

(52) U.S. Cl. ........................ 358/1.13; 700/221

(58) Field of Classification Search ............... 358/1.13, 358/1.14, 1.15, 1.16, 1.18, 1.1; 271/9.01, 271/3.16, 186, 303; 270/1.01, 58.01, 58.02; 700/221, 223, 219

See application file for complete search history.

(56) References Cited

U.S. PATENT DOCUMENTS

| | | | | |
|---|---|---|---|---|
| 5,178,224 A * | 1/1993 | DiGiulio et al. | ........... | 177/25.15 |
| 6,115,132 A | 9/2000 | Nakatsuma et al. | | |
| 2002/0171864 A1 | 11/2002 | Sesek | | |
| 2004/0260655 A1 * | 12/2004 | Ferraro | ........................ | 705/60 |

FOREIGN PATENT DOCUMENTS

EP 0745435 A2 12/1996

* cited by examiner

*Primary Examiner* — Saeid Ebrahimi Dehkordy
(74) *Attorney, Agent, or Firm* — Brian A. Collins; Charles R. Malandra, Jr.; Steven J. Shapiro

(57) ABSTRACT

A method and system for processing data indicative of pages of mailpiece content material, and for printing pages "on demand" for use in a mailpiece inserter. The method comprises the steps of: (i) transmitting data from the application software to a print processor along read and write paths and (ii) activating one of the write and read such that when one path is activated the other path is inactivated. The data is then rendered into a print control language (PCL) compatible with a printer integrated with the mailpiece inserter and printed for use therein. The method and system mitigates printing errors by eliminating synchronous access to the same data location within the spool file, i.e., by the application software/spooler along the write path and the print processor along the read path.

20 Claims, 5 Drawing Sheets

METHOD AND SYSTEM FOR MITIGATING ERRORS WHEN PROCESSING PRINT STREAM DATA

CROSS REFERENCE TO RELATED APPLICATIONS

This application claims priority under 35 U.S.C. section 119(e) from Provisional Patent Application Ser. No. 60/899,595, filed Feb. 5, 2007, entitled Print Interception Plug-In Architecture with Just-In-Time Printing by Vishnu Sharma et al., which is incorporated herein by reference in its entirety.

TECHNICAL FIELD

The present invention relates to a method for printing mailpiece content material, and, more particularly, to a method which mitigates printing errors due to improper synchronization of the data processing paths when rendering print stream data.

BACKGROUND OF THE INVENTION

A mail insertion system or a "mailpiece inserter" is commonly employed for producing mailpieces intended for mass mail communications. Such mailpiece inserters are typically used by organizations such as banks, insurance companies and utility companies for producing a large volume of specific mail communications where the contents of each mailpiece are directed to a particular addressee. Also, other organizations, such as direct mailers, use mailpiece inserters for producing mass mailings where the contents of each mailpiece are substantially identical with respect to each addressee.

In many respects, a typical inserter system resembles a manufacturing assembly line. Sheets and other raw materials (i.e., a web of paper stock, enclosures, and envelopes) enter the inserter system as inputs. Various modules or workstations in the inserter system work cooperatively to process the sheets until a finished mail piece is produced. Typically, inserter systems prepare mail pieces by arranging preprinted sheets of material into a collation, i.e., the content material of the mail piece, on a transport deck. The collation of preprinted sheets may continue to a chassis module where additional sheets or inserts may be added based upon predefined criteria, e.g., an insert being sent to addressees in a particular geographic region. Subsequently, the collation may be folded and placed into envelopes. Once filled, the envelopes are closed, sealed, weighed, and sorted. A postage meter may then be used to apply postage indicia based upon the weight and/or size of the mail piece.

The capacity, configuration and features of each inserter system depend upon the needs of each customer and/or installation. Until recently, mailpiece inserters were limited to two basic configurations, i.e., low-volume inserters capable of producing between about 5K-10K mailpieces monthly, and high-volume inserters capable of producing in excess of 100K mailpieces daily. To contrast the differences in greater detail, low volume inserters may occupy the space of a conventional office copier and generally will cost less than about twenty-thousand dollars ($20,000). High-volume inserters may extent over 100 feet in length and cost in excess of five million dollars ($5,000,000). Only recently have manufacturers introduced models having an intermediate capacity, i.e., producing between 50K-100K mailpieces monthly. Exemplary models fulfilling these specifications are the DI 900 and DI 950 Model inserters produced by Pitney Bowes Inc., located in Stamford, Conn., USA.

These inserters, whether in the low, intermediate or high-volume categories, typically require the use of "preprinted" sheets which are presented to the various downstream devices by a feed module for subsequent processing. That is, a mailpiece job run is printed to produce an "ordered" stack of mailpiece content material which may be fed to the mailpiece inserter. Scan codes disposed in the margin of the first or last sheet of each mailpiece document provide the instructions necessary to process the mailpiece, i.e., whether additional inserts will be added, how the content material is to be folded (C-fold, Z-fold, etc.) and/or what size envelope will the content material be contained. To facilitate communication of these instructions, a user computer and a printing device are typically network connected to the mailpiece inserter such that scan codes can be easily printed and interpreted.

While it has long been desirable to print mailpiece content material "on-demand", and/or "just-in-time", to facilitate the flow and handling of mailpiece content material, certain processing and mechanical limitations on print operations have preempted the physical integration of printing devices with mailpiece inserters. More specifically, the lengthy time required to process and print complex print jobs has provided little motivation to physically integrate the two processes/devices. Furthermore, difficulties associated with matching the throughput of the printer with downstream devices of the mailpiece inserter, i.e., a lack of throughput compatibility between printers and mailpiece inserters, has also mitigated practical integration.

To better understand the difficulties, consider, for example, a complex print job containing some fifty-thousand (50,000) sheets of mailpiece content material. When employing conventional print control logic, spoolers and print drivers, the time required to process the print job (excluding print time) will nominally consume several hours. Thereafter, the time required to print the spooled data, (even when printing at the maximum speed of some of the most advanced, commercially-available printers, which print at a speed of about fifty-five (55) pages per minute) can span an additional fifteen (15) hours (i.e., 50,000 sheets×1 min/55 sheets×1 hour/60 min). Consequently, a print job for a mailpiece inserter can consume some eighteen (18) hours before mailpieces can be stacked and/or fed to the first station or module of a mailpiece inserter.

While conventional operating systems employ a spool file to free up the application software e.g., document processing software such as MS Word® (MS Word is a registered trademark of the Microsoft Corporation) during print operations, mailpiece inserters cannot begin operations, i.e., processing mailpiece content material, until the print job is complete. In addition to the time required for processing/printing, should an error occur during print processing, the entire print job must be re-run or processed again in an attempt to rectify the error. Moreover, most printing errors are not visible or apparent until the entire print job is complete, i.e., which, as mentioned in the preceding paragraph, can consume the better part of a full day.

A need, therefore, exists for a method and system which enables mailpiece content material to be printed "on demand" while mitigating/eliminating errors when processing complex print jobs. The method and system, therefore, operates to facilitate/enhance the flow, handling and accuracy of printed content material

SUMMARY OF THE INVENTION

A method and system is provided for processing data indicative of pages of mailpiece content material, and for printing pages "on demand" for use in a mailpiece inserter. The method comprises the steps of: (i) transmitting data from the application software to a print processor along read and write paths and (ii) activating one of the write and read such that when one path is activated the other path is inactivated. The data is then rendered into a print control language (PCL) compatible with a printer integrated with the mailpiece inserter and printed for use therein. The method and system mitigates printing errors by eliminating synchronous access to the same data location within the spool file, i.e., by the application software/spooler along the write path and the print processor along the read path.

BRIEF DESCRIPTION OF THE DRAWINGS

The accompanying drawings illustrate presently preferred embodiments of the invention, and, together with the general description given above and the detailed description given below, serve to explain the principles of the invention. As shown throughout the drawings, like reference numerals designate like or corresponding parts.

BEST MODE TO CARRY OUT THE INVENTION

The inventive method and system for printing and producing mailpieces is described in the context of a mailpiece inserter system. Further, the invention is described in the context of DI 900 and DI 950 Model Mailpiece Inserters, i.e., mailpiece creation systems produced by Pitney Bowes Inc., located in Stamford, State of Connecticut, USA, though, the inventive subject matter may be employed in any mailpiece inserter and/or in print manager software algorithms used in the printing/creation of mailpieces such as PBFirst® ("PB-First" is a registered trademark of Pitney Bowes Inc), a software product for printing mailpieces processed by a mailpiece inserter system.

Figure 1:
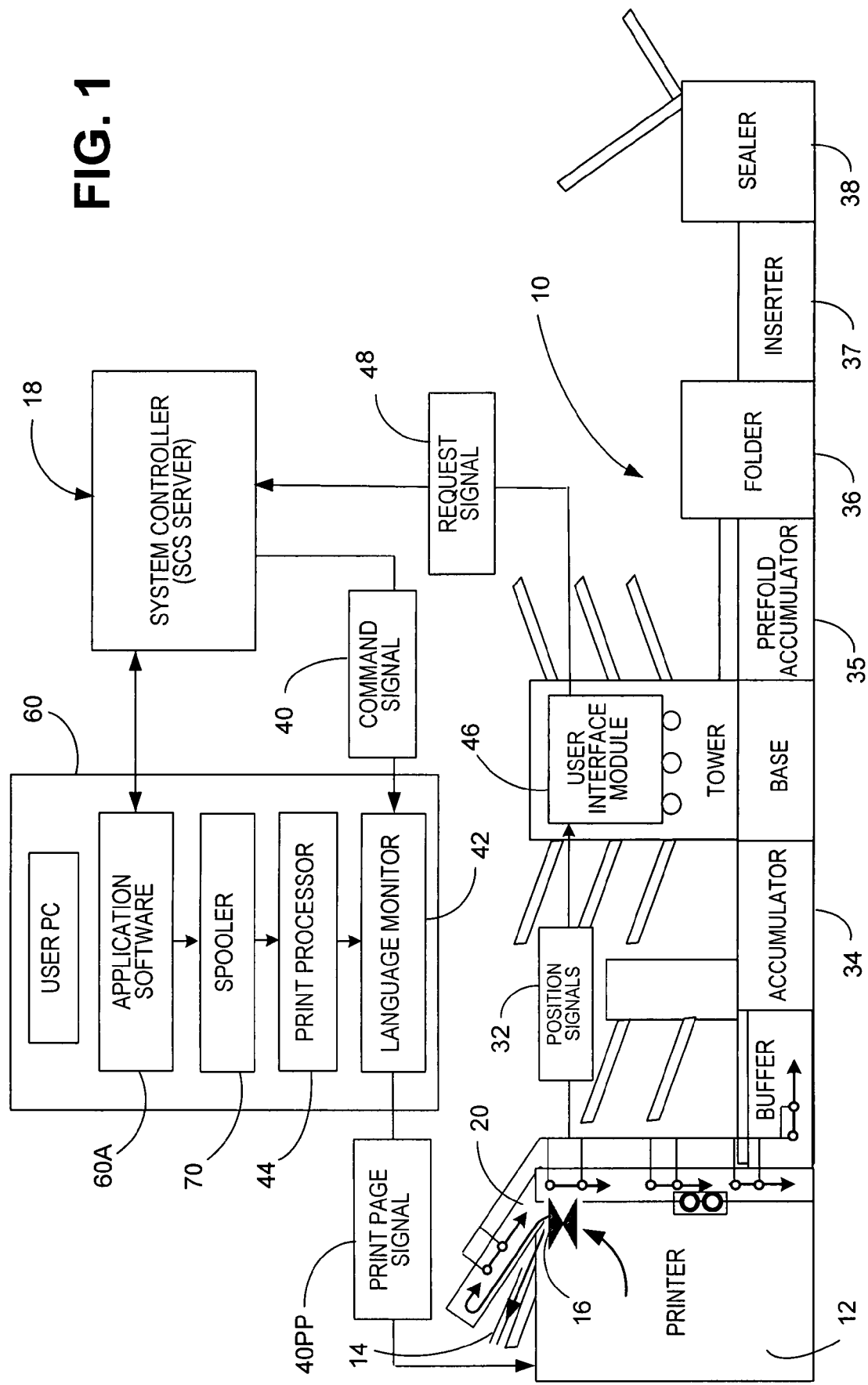
FIG. 1 is a schematic diagram of a mailpiece inserter or mailpiece creation system having a printer integrated upstream of the various mailpiece inserter or processing modules, i.e., a mechanical page buffer, folder, accumulator, inserter, and sealer.

Before discussing the invention in greater detail, it will be useful to understand the principle components and system architecture of a mailpiece inserter having an integrated printer. In FIG. 1, a printer 12 is integrated with a mailpiece inserter 10 and is disposed upstream of various inserter devices (also referred to as downstream devices relative to the dedicated printer 12) which handle and process pages or sheets of mailpiece content material 14. The printer 12 may include a diverter mechanism 16 to send printed material, whether or not intended for use with the inserter 10, to an output tray. Consequently, the printer 12 may be used to print sheets for use when producing mailpieces, i.e., feeding sheets to the mailpiece inserter 10, or as a dedicated high-output printer. That is, since the integrated printer is capable of printing sheet material at a high rate, the printer has greater value when configured as a dual use printer. In the preferred embodiment, an HP 4350 and HP 4700 model printer system, manufactured by Hewlett Packard (HP), is integrated with the mailpiece inserter. The HP 4350 printer system has an output rate of approximately fifty-five (55) pages per minute (i.e., single color or black print) while the HP 4700 is capable of printing approximately thirty (30) pages per minute (colored print).

The mailpiece inserter 10 includes an inserter control system or controller 18 operative to monitor the throughput rate of the at least one downstream devices. In the context used herein, "throughput" or "throughput rate" is a measure of the productivity and/or rate at which mailpiece content material may be printed, handled and/or otherwise processed. For example, the throughput may be measured by sensing the number of sheets processed over a fixed period of time. Alternatively, the throughput may be measured by sensing when a sheet passes a predefined point or fixed position along the feed path of the mailpiece creation system. As such, upon passing the fixed position, the system can send a feedback or command signal indicative of the current status or rate of sheet processing.

Figure 2:
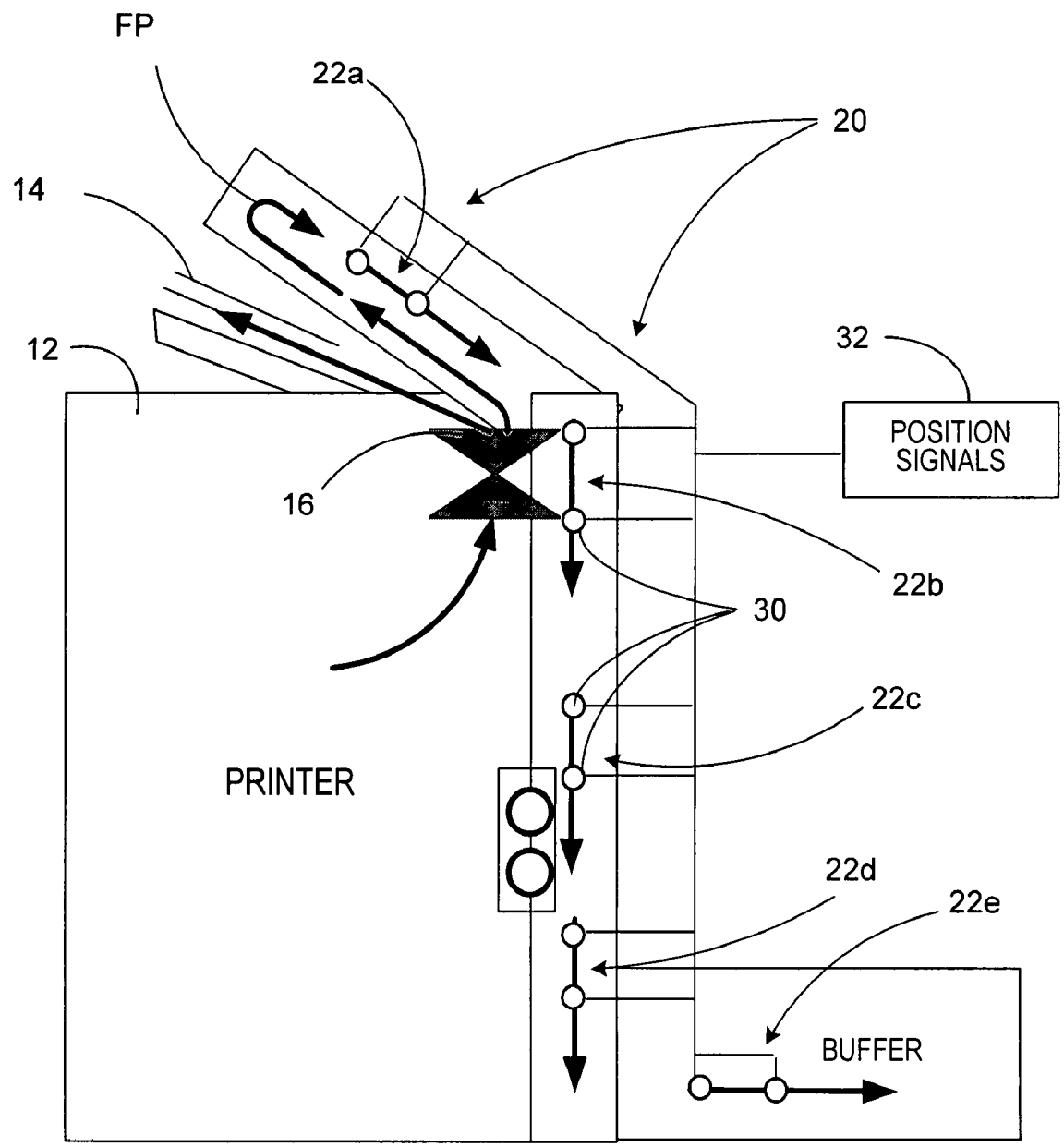
FIG. 2 is an enlarged schematic diagram of a mechanical printer/page buffer which senses the throughput status of mailpiece content material prior to downstream processing by the inserter.

In FIGS. 1 and 2, a mechanical printer/page buffer 20 (referred to hereinafteras a "page buffer") is disposed downstream of the printer 12 and functions to monitor/track the throughput of printed pages being processed by the inserter 10. More specifically, the printer/page buffer 20 receives printed content material from the printer 12 and includes a plurality of sequential page stations 22a, 22b, 22c, 22d, 22e (FIG. 2) disposed along the feed path FP of an internal conveyor. Sensing devices 30 are located at or along each of the page stations 22a, 22b, 22c, 22d, 22e and are operative to monitor whether the stations 22a, 22b, 22c, 22d, 22e are filled or empty. Furthermore, the sensors 30 provide information concerning the rate that printed pages enter or leave the page buffer 20. Furthermore, the sensing devices 30 are operative to issue position signals 32 to the system controller 18 such that the inserter may determine whether a page is positioned at a particular one of the page stations 22a, 22b, 22c, 22d, 22e. In the described embodiment, the sensing devices 30 are photocells, though any position sensor may be employed.

Figure 3:
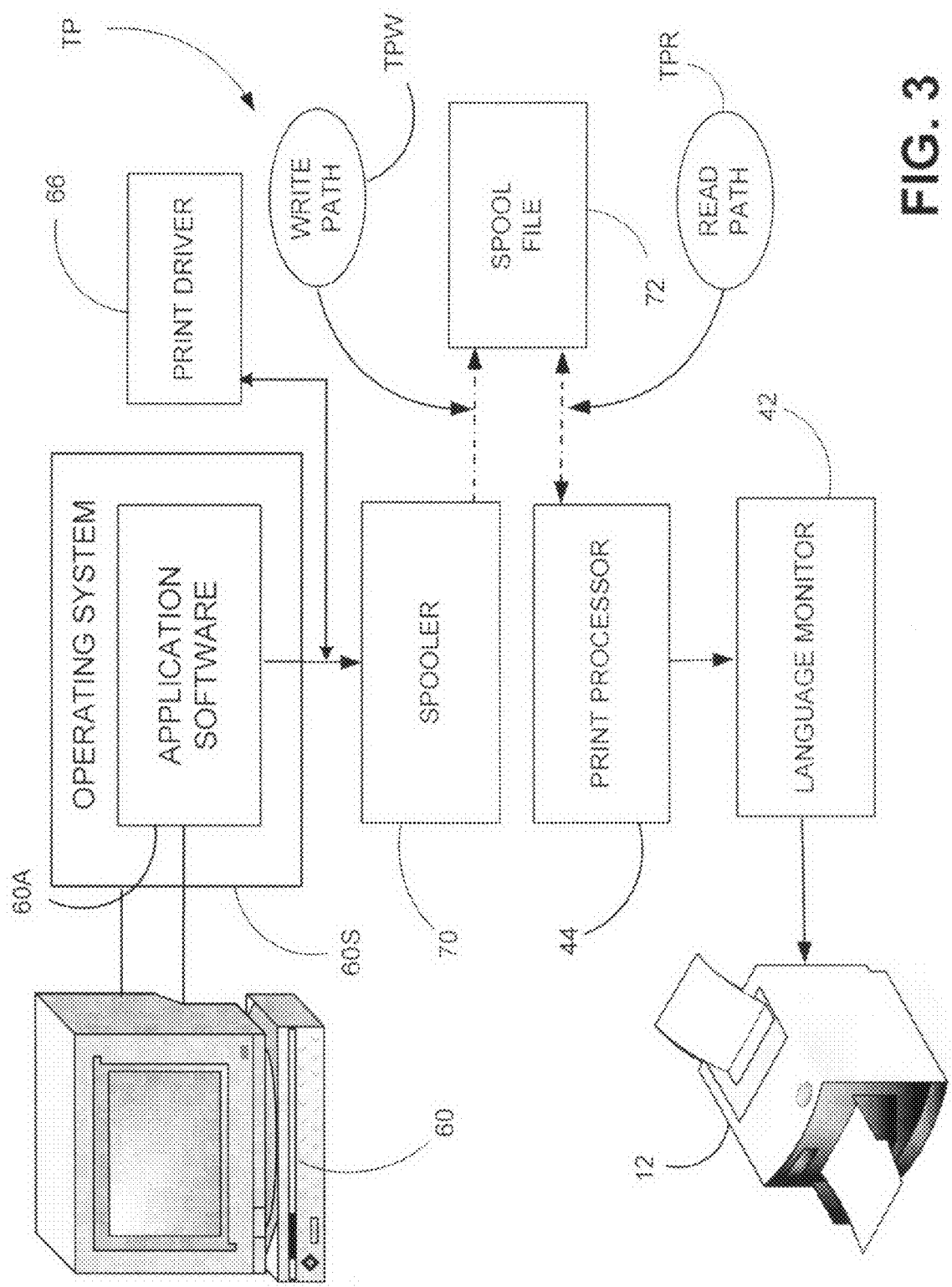
FIG. 3 pictorially depicts the write and read paths along which print stream data flows, i.e., from application software to a print processor.

The rate of change of the position signals 32 issued by the page buffer 20 may be used by the controller 18 to determine the throughput that content material 14 is to be processed and printed. Generally, it is the objective of the system controller 18 to throttle or drive the printer 12 to produce content material 14 at a rate consistent/commensurate with the rate of processing by other downstream devices of the mailpiece inserter 10. While, in the described embodiment, one of the downstream devices is a page buffer 20 for issuing position signals 32 for determining a throughput rate, it should be appreciated that any downstream device may be adapted to issue a throughput signal indicative of the rate/status of content material processing downstream of the printer 12. In FIG. 3, such downstream devices may additionally, or alternatively, include an accumulator 34, a pre-fold accumulator 35, a folder 36, envelope inserter 37, and/or a sealer 38.

The system controller 18 monitors the throughput rate and issues command signals 40 indicative of the number of content material pages 14 to be produced by the integrated printer 12. More specifically, the command signals 40 are indicative of a specific page number along with the number of pages to follow. For example, the controller 18 may issue command signals requesting that the printer 12 generate page number thirty (Page #30) plus five (5) additional pages of content material 14. In this example, the page buffer 20 will have determined that the page stations 22a, 22b, 22c, 22d, 22e can accommodate additional sheets of content material 28.

Before this request or signal is issued to the printer 12 (in a more conventional sense), the controller 18 issues the command through a page-based language monitor 42. In the preferred embodiment, the system controller 18 generally issues a command signal 40 to print between three (3) to seven (7) pages with each request, though several command signals 40 may be generated within a very brief period.

In the described embodiment, the mailpiece inserter 10 includes a User Interface Module (UIM) 46 interposing the page buffer 20 and the system controller 18. The UIM 46 is responsive to the position signals 32 of the page buffer 20 for determining when additional content material 14 can be accepted by the page buffer 20. Furthermore, the UIM 46 is operative to issue a request signal 48 to the system controller 18, which request signal 48 is indicative of the number of mailpiece content pages 14 to the printed. Hence, conversion of the position signals 32 to a command signal 48 may be performed by either the system controller 18 or the UIM 46, depending upon where the program logic or intelligence therefor is located.

Before discussing various features of the invention associated with mitigating printer errors and optimizing throughput, it will be useful to finish our discussion associated with controlling or throttling the integrated printer 12. The page-based language monitor 42 (hereinafter the "language monitor" or "LM") receives print stream data from the application software 60A of a User PC/computer processor 60. More specifically, the language monitor 42 receives print stream data from a page-based print processor 44 and is interposed between the system controller 18 and the integrated printer 12. In the broadest sense, the language monitor 42 is the gate-keeper of data communicated to the printer 12 from the controller 18. More specifically, the language monitor 42 retains material content data, including an object-data dictionary (sometimes referred to as a "library"), for each page of content material and triggers the printer 12 to generate a particular page along with N number of additional pages. While the request to print is made by the controller 18, the language monitor 42 contains the active program code which intercepts the print stream data, i.e., the print control language (PCL) data, from a printer driver to throttle the rate at which content material 14 is generated.

Furthermore, the language monitor 42 is operative to provide print stream data in a form compatible with the integrated printer 12 (a task performed by a printer driver—not shown in FIG. 1), vary the flow of print stream data and issue a print page signal 40PP to the integrated printer 12. More specifically, the language monitor 42 includes a buffer file capable of storing about 300 MB (300,000,000 bytes) of data. The buffer file is capable of storing multiple pages of data, including duplex pages. Hence, in the context used herein, a "page" of data includes all data which may be found on the front and back of a two-sided sheet of paper. Additionally, the language monitor 42 is not tied to any dedicated print driver. As such, the language monitor 42 can operate without impacting the function of any print driver which may be employed. In the preferred embodiment, the page-based language monitor 42 communicates with the printer 12 across a USB line.

The principle function of the page-based print processor 44 is segmenting the print stream into data packets, each being indicative of a self-contained page of mailpiece content material. In the context used herein, a "self-contained page of data" is a data set/packet of the data contained in a single page of content material 14, including an object-data dictionary associated with the page of content material 14. Accordingly, the page has all of the necessary components/elements, including a dictionary of the page objects (e.g., font, font size, type-face, spacing, margins, formatting, etc.) required for printing. Furthermore, the page-based print processor 44 parses the print stream so as to automatically attach an object-data dictionary to each page of data.

Print jobs in connection with generating mailpiece content material 14 for mailpiece inserters 10 are orders of magnitude larger than print jobs conventionally produced by variable content printers, i.e., inkjet, bubble-jet and/or laser printers. As mentioned in the "Background of the Invention", print jobs of this size commonly consume more than fifteen (15) hours for the sole purpose of processing/printing. Furthermore, a single error can result in a need for the entire print job to be re-processed, thus doubling the processing time. Moreover, since the throttling commands for requesting additional pages, or for the regeneration of pages, are typically based upon printing a threshold number of pages (e.g., page number×plus five (5) additional pages), mailpieces can be improperly filled or fabricated. That is, should a page be misprinted, blank or missing, the page count and, consequently, the set of pages inserted into the envelope can be incorrect.

An example of a particularly troublesome processing error relates to a timing or synchronization error recently encountered when processing large print jobs such as those associated with printing mailpiece content material. As initially experienced, the processing error resulted in the printing/generation of an additional "blank" sheet/page of content material. That is, a blank sheet was generated with a frequency of about one sheet in every twenty-thousand (20,000) sheets of printed content material. For conventional printed documents, which typically require less than one-hundred (100) sheets of content material, the generation of a single blank sheet can be tolerated, i.e., without significant adverse consequences. On the other hand, print jobs for mailpiece inserters can exceed one-hundred thousand (100,000) sheets, and, as a result, each job printed can potentially experience this anomaly.

To better understand the blank-page anomaly, time studies/analyses were performed which enabled the inventors to develop a hypothesis concerning the root-cause of the error together with a solution to mitigate the anomaly. More specifically, an evaluation of the data revealed that processing errors occurred in the transmission path from the application software to the print processor. It was also thought that the large size of mailpiece print jobs and the high processing rates appeared to exacerbate the processing error. Finally, it was discovered that the timing/synchronization problem develops as a result of files accessing data, at the same location at the same time. More specifically, it was shown that a statistically-significant probability exists that the application software/spooler can write data to a location within the spool file at the same time that a print processor attempts to read data from that same location. It is this conflict or simultaneous access that causes the printing/issuance of a blank page during print processing.

To view the inventive method and system pictorially, FIG. 3 shows the transmission path TP, i.e., the write and read paths TPW, TPR, along which print stream data flows from the application software 60A, to a print processor 44, and finally to the integrated printer 12. More specifically, the computer processor 60 includes program code 60S for system operation and application software 60A to generate the mailpiece content material. Furthermore, when an a print command is issued using an application 60A, e.g., a word processing program such as MS Word® (MS Word is a registered Trademark of Microsoft Corporation located in Seattle, State of Washington), the operating system 60S uses a Graphics Device Interface (not shown) and print driver 66 to render the data into print command language (PCL) which is compatible with the integrated printer 12. A spooler 70 then writes the print stream data to a spool file 80. This segment of the transmitted data is referred to as the "write path" TPW, inasmuch as the spooler 70 processes the data and "writes" or stores the processed data to a location in the spool file 80.

Along another path, referred to as the "read path" TPR, the print processor 44 accesses/retrieves the data previously written to the spool file 80 by the spooler 70. This path is shown as being two-way, inasmuch as the print processor 44 accesses the spool file 80 many times as the printer begins and ends a particular portion of the print job. The function and operation of the print processor 44 and language monitor 42 have been described in preceding paragraphs, hence, to facilitate the discussion, no further discussion is warranted at this juncture. Suffice to say that the print processor 44 and language monitor 44 process the print job and throttle the print stream data to the integrated printer 14.

Figure 4A:
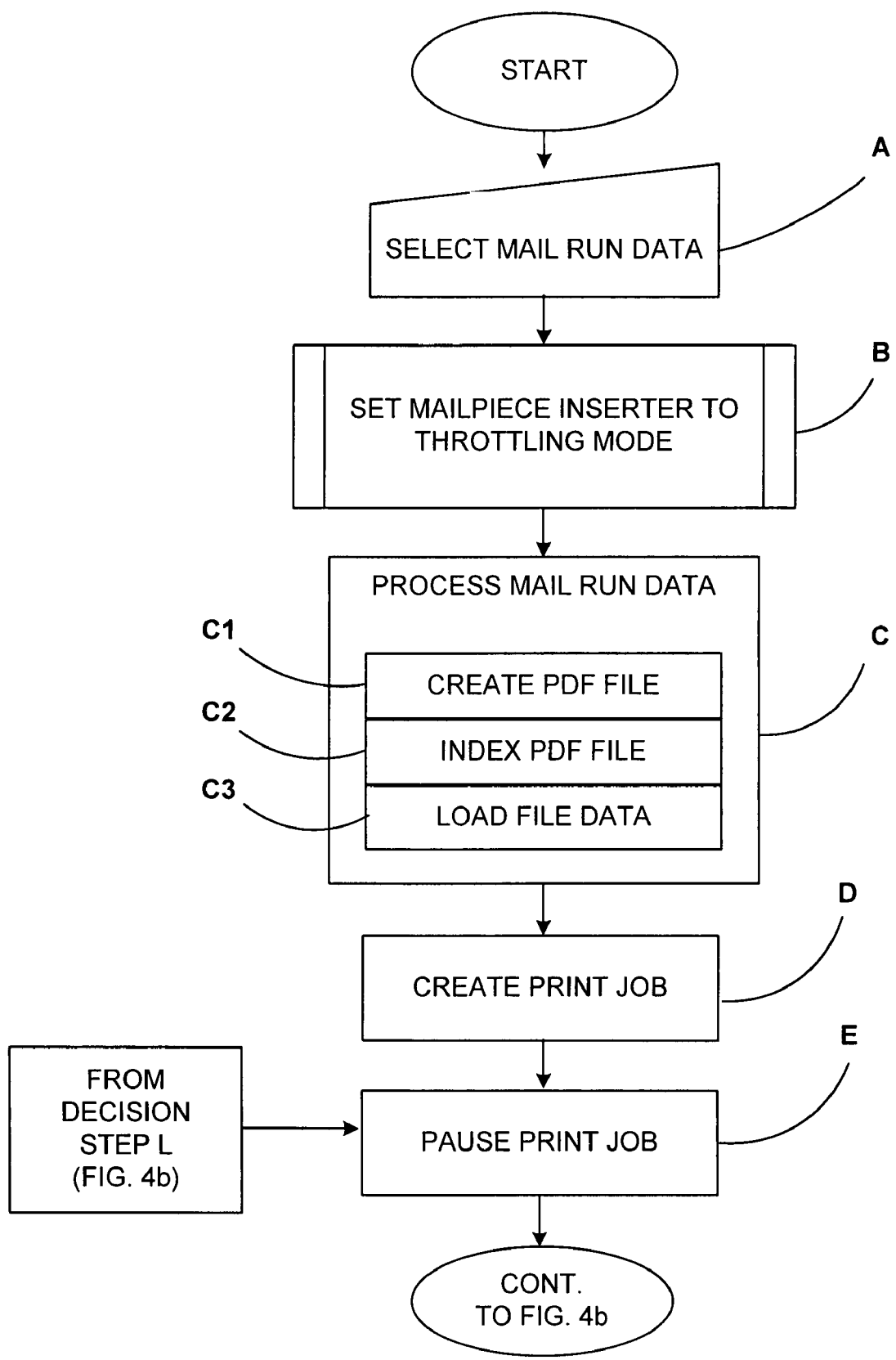
FIGS. 4a and 4b depict a flow diagram of the method steps according to the present invention for decoupling the write and read paths to mitigate printing errors.
Figure 4B:
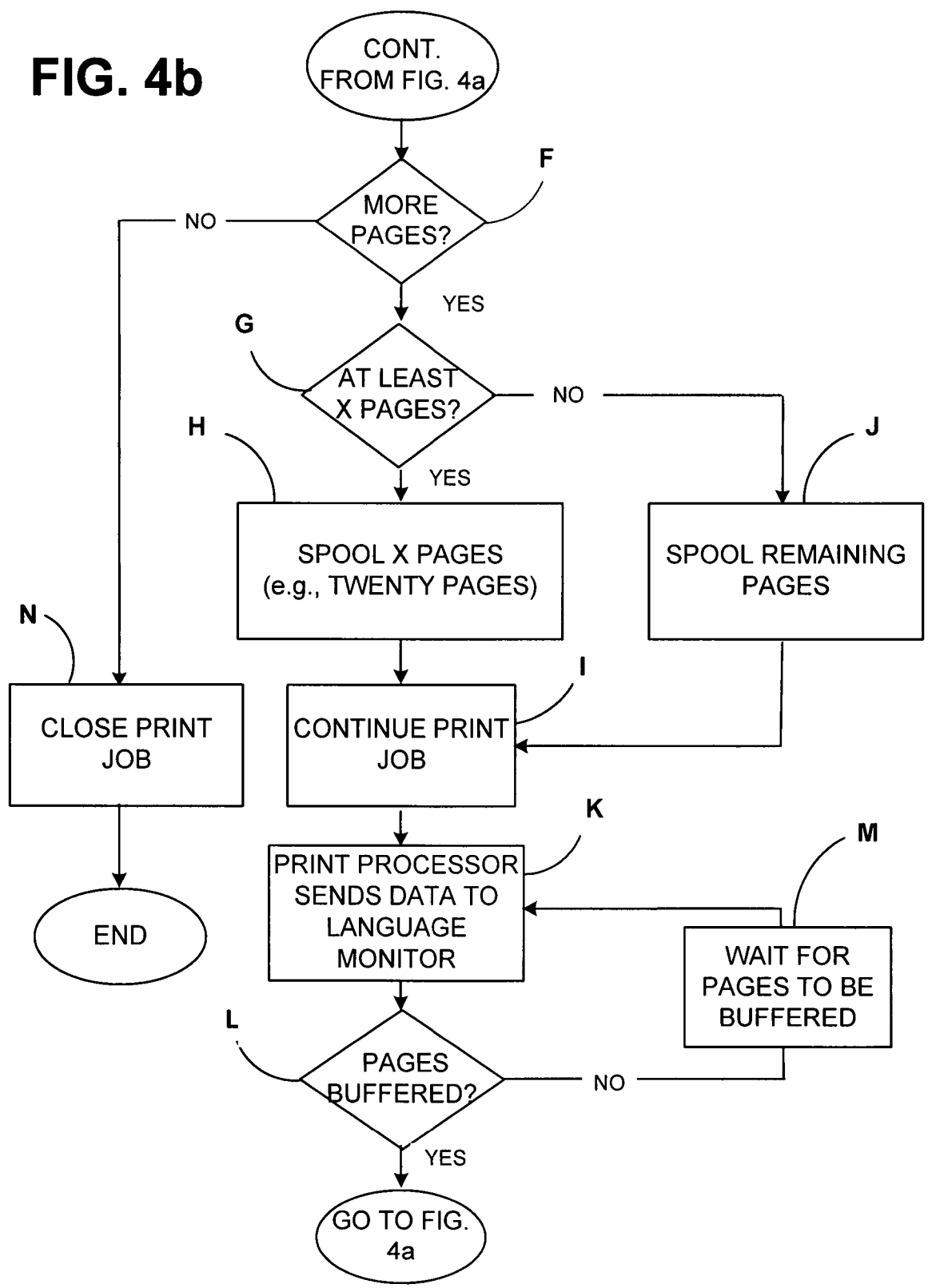

In the broadest sense of the inventive method, print stream data is transmitted along the write and read paths TPW, TPR from the application software 60S to the print processor 44. To mitigate the propensity for processing errors, the method alternately activates the transmission paths TPW, TPR such that one of the paths TPW, TPR is active while the other of the paths TPW, TPR is inactive. More specifically, and referring to FIGS. 3, 4a and 4b, in Step A, a mail run or print job is selected for processing and printing. As discussed previously, the mailpiece inserter 10 is set to a throttling mode, in Step B, such that content material may be printed "as requested" or "on demand". To facilitate this process, the mail run data is processed, in Step C, by creating object oriented files or PDF files of each sheet of content material 14 and indexing each file (i.e., assigning an index number to each sheet). These steps, along with a loading routine, are performed in Steps C1-C3. Co-pending commonly owned U.S. patent application Ser. No. 11/343,706, entitled, "Document Format and Print Stream Modification for Fabricating Mailpieces" (Docket No. F-993), describes the various steps and advantages associated with creating PDF files/logical documents and is herein incorporated by reference in its entirety.

In step D, the application software 60A and operating system 60S create a print job in a conventional manner. Next, in Step E, before any additional processing begins, a "pause print" command is issued to control the subsequent processing steps. In decision Steps F and G, a determination is made in Step F concerning whether pages have been previously processed (i.e., buffered) for printing and in Step G whether a threshold number of pages of data are available for printing. The necessity for Steps F and G will be better understood when the entire flow of the diagram has been fully described and examined.

With respect to the Step G, however, it is useful to understand that the inventive method establishes an optimum number of pages to be processed, i.e., by the application software 60A and print processor 44. For maintaining maximum throughput, the inventors learned that a threshold number of pages can be printed which enables the write and read paths TPW, TPR to be operated independently or, stated in yet other terms, which prevents simultaneous transmission of print stream data along both paths TPW, TPR. In the described embodiment, the threshold number of pages which can be processed to maintain optimum throughput is within a range of between about ten (10) to about (30) pages. For yet greater proficiency, the threshold numbers and range may be limited to between about sixteen (16) to about twenty-four (24) pages of content material. In Steps H and J, either the threshold number of pages, in Step H, or the remaining number of pages (i.e., remaining in the print job), in Step J, are spooled along the write path TRW to the spool file 72 (see FIG. 3). At this juncture in the flow diagram, the write path TRW is active while the read path TPR is inactive.

Following the spooling Steps H and J, a "continue print job" command is issued in Step I. At this juncture the read path TPR is activated by issuing a "continue printing" command in Step I. In step K, the print processor 44 reads the data from the spool file 72, processes the data, and sends it to the language monitor 42. As mentioned earlier, the print processor 44 segments the print stream data into packets, each being indicative of a self-contained page of mailpiece content material. In decision step L, a determination is made concerning whether the language monitor 42 has properly buffered the pages for printing. If the pages are still in process, a clock will continue to wait until all pages have been buffered, i.e., stored for printing. As mentioned earlier, the controller 18 will issue a request signal 48 (See FIG. 1) to print between three (3) to seven (7) pages at any moment in time. Though, in the described example, twenty (20) pages have been buffered in the language monitor 42 awaiting for a print request to throttle the printer 12. In addition, therefore, to activating one or the other of the write and read paths TPW, TPR, this portion of the operating system program code buffers a threshold number of pages for printing in anticipation of a print request signal 48 (i.e., from the SCS controller 18).

When the correct number of pages have been buffered in Step L, the routine returns to Step E to once again pause the print job. By pausing the print job, data flow along the read path is interrupted and inactivated such that data can flow again at the spooling steps H and J. Hence, by alternately issuing "pause" and "continue" print commands, the write and read paths TPW, TPR are activated and inactivated. This alternating activity or routine continues until all pages, perhaps as many as one hundred thousand (100,000) sheets/pages have been spooled, buffered and printed. When no additional pages are available in Step F, a close print job command is issued in Step N which ends the job run/routine.

In summary, the inventive system and method intercepts and throttles the print stream to optimize the throughput of a mailpiece creation system. Furthermore, the invention facilitates the creation, modification and printing of mailpieces produced by a mailpiece inserter. Processing errors associated with simultaneously accessing the spool file 72 at the same data location and the generation of additional blank-pages is eliminated. That is, by alternately activating the write and read paths TPW, TPR there can be no conflict with respect to data access. Moreover, by buffering an optimum number of pages in anticipation of a request signal from the system controller, "on-demand" printing is made possible. That is, the mailpiece inserter can print "just in time" without incurring gaps or delays which may reduce the throughput of a high-output integrated printer.

It is to be understood that the present invention is not to be considered as limited to the specific embodiments described above and shown in the accompanying drawings. The illustrations merely show the best mode presently contemplated for carrying out the invention, and is susceptible to such changes as may be obvious to one skilled in the art.

The invention is intended to cover all such variations, modifications and equivalents thereof as may be deemed to be within the scope of the claims appended hereto.

The invention claimed is:

1. A method for processing data generated by application software residing on a computer, the data indicative of pages of mailpiece content material for printing, and for printing the pages to be used in a mailpiece inserter having an integrated printer, the method comprising the steps of
    transmitting data from the application software to a print processor along read and write paths;
    activating one of the read and write paths such that one of the paths is active while the other of the paths is inactive;
    rendering the data into a print control language (PCL) compatible with the integrated printer; and
    printing the data to generate the pages of content material.

2. The method according to claim 1 wherein the step of transmitting data includes the steps of:
    reading data along the read path from the application software to a spool file via a spooler interposing the application software and spool file;
    writing data along the write path from the spool file to the print processor.

3. The method according to claim 1 wherein the computer includes an operating system adapted to monitor and control the flow of data from the application software to the printer and wherein the step of alternately decoupling the read and write paths includes the steps of:
    interrupting the flow of data from the application software following the transmission data associated with a threshold number of pages.

4. The method according to claim 3 wherein the threshold number of pages is within a range of between ten (10) and thirty (30) pages.

5. The method according to claim 1 wherein the step of enabling and disabling the read and write paths further includes alternately activating each of the write and read paths.

6. The method according to claim 2 wherein the computer includes an operating system adapted to monitor and control the flow of data from the application software to the printer and wherein the step of alternately decoupling the read and write paths includes the step of:
    interrupting the flow of data from the application software following the transmission of data associated with a threshold number of pages.

7. The method according to claim 3 wherein the step of interrupting the flow of data includes the steps of
    issuing a command signal to the application software to pause the flow of data;
    determining whether additional pages of data reside in the spool file for printing;
    determining whether the data associated with the additional number of pages is at least equal to the data associated with the threshold number of pages;
    issuing a command signal to the application software to continue the flow of data, and
    transmitting the data indicative of the threshold number of pages to a print driver to render the data.

8. The method according to claim 7 further comprising the step of:
    transmitting a remainder of data when it is determined that the remainder is less than the data associated with the threshold number of pages.

9. The method according to claim 8 further comprising the step of:
    discontinuing the flow of data when it is determined that no additional data is available for printing.

10. A system for use in connection with a mailpiece inserter, the system operative to process and print data indicative of content material pages, the system comprising:
    a processor including program code for system operation and application software for generating the print data; and
    a printer integrated with the mailpiece inserter and operative to receive compatible print data for printing the pages of mailpiece content material;
    the operating system program code (i) operable to render the print data into compatible print data for use by the integrated printer; (ii) defining a write path for the transmission of data between the application software and a spool file, (iii) defining a read path for the transmission of data between the spool file and a print processor, and (iv) operable to alternately enable one of the write and read paths while disabling the other of the write and read paths.

11. The system according to claim 10 wherein the program code is operative to read data along the read path from the application software to a spool file via a spooler interposing the application software and spool file, and write data along the write path from the spool file to the print processor.

12. The system according to claim 10 wherein the operating system is adapted to monitor and control the flow of data from the application software to the printer and wherein the program code is operative to interrupt the flow of data from the application software following the transmission data associated with a threshold number of pages.

13. The system according to claim 11 wherein the threshold number of pages is within a range of between ten (10) and thirty (30) pages.

14. The system according to claim 13 wherein the threshold number of pages is within a range of between sixteen (16) to twenty-four (24) pages.

15. The system according to claim 11 wherein the operating system is adapted to monitor and control the flow of data from the application software to the printer and wherein the program code is operative to interrupt the flow of data from the application software following the transmission data associated with a threshold number of pages.

16. The system according to claim 12 wherein the program code is operative to:
    issue a command signal to the application software to pause the flow of data;
    determine whether additional pages of data reside in the spool file for printing;
    determine whether the data associated with the additional number of pages is at least equal to the data associated with the threshold number of pages;
    issue a command signal to the application software to continue the flow of data; and,
    transmit the data indicative of the threshold number of pages to a print driver to render the data.

17. The system according to claim 11 wherein the threshold number of pages is within a range of between ten (10) and thirty (30) pages.

18. The system according to claim 17 wherein the threshold number of pages is within a range of between sixteen (16) to twenty-four (24) pages.

19. The system according to claim 16 wherein the program code is operative to transmit a remainder of data when it is determined that the remainder is less than the data associated with the threshold number of pages.

20. The system according to claim 19 wherein the program code is operative to discontinue the flow of data when it is determined that no additional data is available for printing.

* * * * *